(12) United States Patent
Limaye et al.

(10) Patent No.: US 7,161,899 B2
(45) Date of Patent: Jan. 9, 2007

(54) INTERLOCKING SONET/SDH NETWORK ARCHITECTURE

(75) Inventors: Pradeep Shrikrishna Limaye, Westfield, NJ (US); Heena Nandu, Sunnyvale, CA (US)

(73) Assignee: Bay Microsystems, Inc., San Jose, CA (US)

( * ) Notice: Subject to any disclaimer, the term of this patent is extended or adjusted under 35 U.S.C. 154(b) by 809 days.

(21) Appl. No.: 09/909,550

(22) Filed: Jul. 20, 2001

(65) Prior Publication Data

US 2003/0026281 A1 Feb. 6, 2003

(51) Int. Cl.
*G01R 31/08* (2006.01)
(52) U.S. Cl. .................. 370/223; 370/539; 370/406
(58) Field of Classification Search ............... 370/539, 370/541, 216, 221, 222, 223, 224, 227, 228, 370/405, 406
See application file for complete search history.

(56) References Cited

U.S. PATENT DOCUMENTS

| | | | | |
|---|---|---|---|---|
| 5,537,393 A * | 7/1996 | Shioda et al. | ............... | 370/223 |
| 5,661,720 A * | 8/1997 | Taniguchi | ................... | 370/223 |
| 5,923,646 A * | 7/1999 | Mandhyan | ................. | 370/254 |
| 5,949,755 A * | 9/1999 | Uphadya et al. | ............ | 370/224 |
| 6,154,296 A * | 11/2000 | Elahmadi et al. | ............. | 398/83 |
| 6,324,162 B1 * | 11/2001 | Chaudhuri | ................. | 370/225 |
| 6,452,931 B1 * | 9/2002 | Norman, Jr. | ................ | 370/405 |
| 6,529,298 B1 * | 3/2003 | Phelps et al. | .................. | 398/9 |
| 6,535,529 B1 * | 3/2003 | Ichihashi | ..................... | 370/535 |
| 6,608,836 B1 * | 8/2003 | Mao et al. | ................... | 370/419 |
| 6,654,341 B1 * | 11/2003 | Chi et al. | ................... | 370/216 |
| 6,683,849 B1 * | 1/2004 | Langridge et al. | .......... | 370/223 |
| 6,717,953 B1 * | 4/2004 | Heuer et al. | ................ | 370/466 |
| 6,725,401 B1 * | 4/2004 | Lindhorst-Ko | ............... | 714/47 |
| 6,850,660 B1 * | 2/2005 | Notani | ........................ | 385/16 |
| 6,895,182 B1 * | 5/2005 | Moriyama et al. | ............ | 398/3 |

OTHER PUBLICATIONS

"The New Economics of Optical Core Networks—A Look at the Economic Implications of CIENA's Multiwave CoreDirector," A Whitepaper by CIENA Corporation, Sep. 1999.

* cited by examiner

*Primary Examiner*—Chau Nguyen
*Assistant Examiner*—Andrew C. Lee (57) ABSTRACT

A SONET/SDH architecture is disclosed that enables the multiplexing of STS-1's from different SONET/SDH rings into a single STS-N for transmission via a single optical fiber, but while maintaining the association of each of the STS-1's with its respective SONET/SDH ring. For example, when an STS-48 carries 12 STS-1's from a first SONET/SDH ring and 12 STS-1's from a second SONET/SDH ring, the STS-48 carries: the automatic protection switching channel for the 12 STS-1's from the first SONET/SDH ring (with addresses specified in the address space of the first SONET/SDH ring); and the automatic protection switching channel for the 12 STS-1's from the second SONET/SDH ring (with addresses specified in the address space of the second SONET/SDH ring).

4 Claims, 4 Drawing Sheets

Figure 4 excellent.

INTERLOCKING SONET/SDH NETWORK ARCHITECTURE

FIELD OF THE INVENTION

The present invention relates to telecommunications in general, and, more particularly, to a novel architecture for SONET/SDH networks.

BACKGROUND OF THE INVENTION

The first generation of optical fiber systems in the public telephone network used proprietary architectures, equipment line codes, multiplexing formats, and maintenance procedures. This diversity complicated the task of the Regional Bell Operating Companies and the interexchange carriers who needed to interface their equipment with these diverse systems.

To ease this task, Bellcore initiated an effort to establish a standard for connecting one optical fiber system to another. That standard is officially named the Synchronous Optical Network but it is more commonly called "SONET." The international version of the standard is officially named the Synchronous Digital Hierarchy but it is more commonly called "SDH."

Although differences exist between SONET and SDH, those differences are mostly in terminology. In virtually all practical aspects, the two standards are the same, and, therefore, virtually all equipment that complies with either the SONET standard or the SDH standard also complies with the other. For the purposes of this specification, the combined acronym/initialism "SONET/SDH" is defined as the Synchronous Optical Network or the Synchronous Digital Hierarchy or both.

With the proliferation of broadband services, the need exists for enhanced SONET/SDH network architectures.

SUMMARY OF THE INVENTION

The present invention provides a SONET/SDH network architecture that avoids some of the costs and disadvantages of SONET/SDH network architectures in the prior art. In particular, the illustrative embodiment of the present invention enables some or all of the STS-1's from different SONET/SDH rings to be multiplexed into a single STS-N for transmission via a single optical fiber yet while retaining their association for automatic protection switching purposes with the SONET/SDH ring that contributed them to the STS-N. For this reason, SONET/SDH rings in accordance with the illustrative embodiment can be considered to be "interlocking."

Although differences exist between the SONET standard and the SDH standard, the illustrative embodiment of the present invention is equally applicable to equipment and networks that comply with either or both standards.

In accordance with the illustrative embodiment, an STS-48 in one optical fiber carries:
1. 6 traffic STS-1's from a first SONET/SDH ring;
2. 6 protection STS-1's for the 6 traffic STS-1's from the first SONET/SDH ring;
3. the automatic protection switching channel for the 6 traffic STS-1's from the first SONET/SDH ring (with addresses specified in the address space of the first SONET/SDH ring);
4. 6 traffic STS-1's from a second SONET/SDH ring; and
5. 6 protection STS-1's for the 6 traffic STS-1's from the second SONET/SDH ring;
6. the automatic protection switching channel for the 6 traffic STS-1's from the second SONET/SDH ring (with addresses specified in the address space of the second SONET/SDH ring).

Although STS-1's from multiple SONET/SDH rings are carried in a single STS-N frame, the illustrative embodiment effectively treats, when a network failure is detected, the STS-1's associated with each SONET/SDH ring as though they were carried on independent optical fibers. In other words, when a failure is detected in any facility in either or both rings, the illustrative embodiment acts to restore each ring as though they were carried on independent optical fibers.

In accordance with the illustrative embodiment, both the node that transmits the STS-48 and the node that receives the STS-48:
1. associate and apply the automatic protection switching channel for the 12 STS-1's from the first SONET/SDH ring only to the 12 STS-1's from the first SONET/SDH ring, and
2. associate and apply the automatic protection switching channel for the 12 STS-1's from the second SONET/SDH ring only to the 12 STS-1's from the second SONET/SDH ring.

This is advantageous because it enables two or more SONET/SDH rings to share a common transmission facility (e.g., optical fiber, etc.).

Furthermore, the illustrative embodiment is advantageous because it facilitates the switching of STS-1's from one SONET/SDH ring to another by providing more options for switching the STS-1's from one SONET/SDH ring to another.

The illustrative embodiment comprises: a first SONET/SDH ring that comprises a first plurality of nodes, wherein the first SONET/SDH ring defines a first address space and wherein each of the first plurality of nodes is identified by a unique address in the first address space; and a second SONET/SDH ring that comprises a second plurality of nodes, wherein second SONET/SDH ring defines a second address space and wherein each of the second plurality of nodes is identified by a unique address in the second address space; wherein there are at least two nodes that have an address in the address space of the first SONET/SDH ring and an address in the address space of the second SONET/SDH ring.

DETAILED DESCRIPTION

Figure 1:
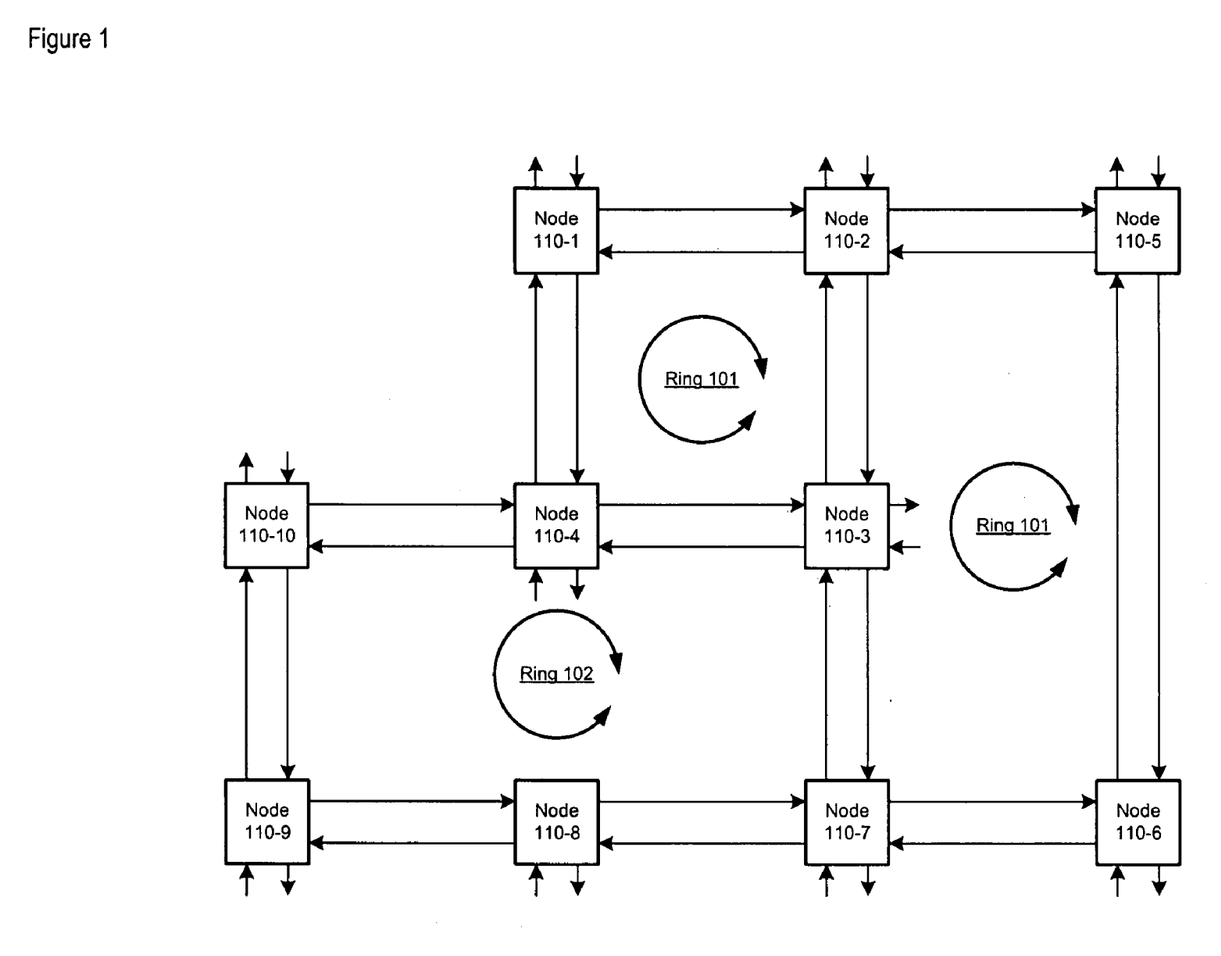
FIG. 1 depicts a schematic diagram of the illustrative embodiment of the present invention.

FIG. 1 depicts a schematic diagram of the illustrative embodiment of the present invention, which comprises three SONET/SDH rings—SONET/SDH ring 101, SONET/SDH ring 102, and SONET/SDH ring 103—interconnected as shown. Although the illustrative embodiment is depicted as comprising three SONET/SDH rings, it will be clear to those skilled in the art how to make and use embodiments of the present invention that comprise two or more SONET/SDH rings.

For the purposes of this specification, a "SONET/SDH ring" is defined as two or more nodes and transmission facilities (e.g., optical fibers, etc.) that connect the nodes to form a closed loop. For the purposes of this specification, a "node" is defined as a SONET/SDH network element that originates and/or terminates STS-N (hereinafter sometimes just "STS-N") lines. As is well known to those skilled in the art, a node can originate, access, modify or terminate line overhead (e.g., payload pointer bytes, automatic protection switching bytes, error monitoring, etc.).

In accordance with the illustrative embodiment:

SONET/SDH ring 101 comprises four nodes: node 110-1, node 110-2, node 110-3, and node 110-4;

SONET/SDH ring 102 comprises five nodes: node 110-2, node 110-3, node 110-5, node 110-6, and node 110-7; and SONET/SDH ring 103 comprises six nodes: node 110-3, node 110-4, node 110-7, node 110-8, node 110-9, and node 110-10.

Although SONET/SDH ring 101, SONET/SDH ring 102, and SONET/SDH ring 103 are depicted as comprising four, five, and six nodes, respectively, it will be clear to those skilled in the art how to make and use alternative embodiments of the present invention in which the each ring comprises a plurality of nodes.

In accordance with the illustrative embodiment, each SONET/SDH ring defines a distinct address space and each node in each ring is identified by a unique address (or "ID") in that address space. For example, the current SONET/SDH standard specifies that it is an address in the address space of a SONET/SDH ring that is carried in the $K_1$ and $K_2$ bytes of the automatic protection system channel of an STS-N frame. In accordance with the current SONET/SDH standard, the address space of a single ring is limited to 16 nodes.

In some alternative embodiments of the present invention, the address space of a single ring is greater than 16 nodes. For example, one or more address extension bytes can be specified and carried in an undefined portion of the STS-N frame transport overhead and used to augment the $K_1$ and $K_2$ bytes. Furthermore, it will be clear to those skilled in the art that embodiments of the present invention are useable whether the extension of the address space is made in accordance with a change to the SONET/SDH standard or in accordance with an independent or proprietary modification to the SONET/SDH standard.

In accordance with the illustrative embodiment, nodes 110-1, 110-2, 110-3, and 110-4 are assigned the following addresses in the address space of SONET/SDH ring 101:

TABLE 1

Node Addresses for SONET/SDH Ring 101

| Node | SONET/SDH Ring 101 Address |
|---|---|
| node 110-1 | 0 |
| node 110-2 | 1 |
| node 110-3 | 2 |
| node 110-4 | 3 |

In accordance with the illustrative embodiment, nodes 110-2, 110-3, 110-5, 110-6, and 110-7 are assigned the following addresses in the address space of SONET/SDH ring 102:

TABLE 2

Node Addresses for SONET/SDH Ring 102

| Node | SONET/SDH Ring 102 Address |
|---|---|
| node 110-2 | 0 |
| node 110-3 | 1 |
| node 110-5 | 2 |
| node 110-6 | 3 |
| node 110-7 | 4 |

In accordance with the illustrative embodiment, node 110-3, 110-4, 110-7, 110-8, 110-9, and 110-10 are assigned the following addresses in the address space of SONET/SDH ring 103:

TABLE 3

Node Addresses for SONET/SDH Ring 103

| Node | SONET/SDH Ring 103 Address |
|---|---|
| node 110-3 | 0 |
| node 110-4 | 1 |
| node 110-7 | 2 |
| node 110-8 | 3 |
| node 110-9 | 4 |
| node 110-10 | 5 |

Table 4 consolidates the information in Tables 1, 2, and 3.

TABLE 4

Node Addresses for All SONET/SDH Rings

| Node | SONET/SDH Ring 101 Address | SONET/SDH Ring 102 Address | SONET/SDH Ring 103 Address |
|---|---|---|---|
| node 110-1 | 0 | — | — |
| node 110-2 | 1 | 0 | — |
| node 110-3 | 2 | 1 | 0 |
| node 110-4 | 3 | — | 1 |
| node 110-5 | — | 2 | — |
| node 110-6 | — | 3 | — |
| node 110-7 | — | 4 | 2 |
| node 110-8 | — | — | 3 |
| node 110-9 | — | — | 4 |
| node 110-10 | — | — | 5 |

In accordance with the illustrative embodiment, each pair of SONET/SDH rings have two nodes in common (i.e., that have an address in the address space of each SONET/SDH ring in the pair). From Table 4 it can be seen that SONET/SDH ring 101 and SONET/SDH ring 102 have nodes 110-2 and 110-3 in common. Furthermore, from Table 4 it can be seen that SONET/SDH ring 101 and SONET/SDH ring 103 have nodes 110-3 and 110-4 in common, and that SONET/SDH ring 102 and SONET/SDH ring 103 have nodes 110-3 and 110-7 in common. In some alternative embodiments of the present invention, some pairs of SONET/SDH rings have two or more nodes in common while other pairs of SONET/SDH rings do not have two or more nodes in common. In some alternative embodiments of the present invention, there is at least one pair of SONET/SDH rings that have three or more nodes in common.

In accordance with the illustrative embodiment, the two nodes that each pair of SONET/SDH rings has in common are adjacent to each other. In some alternative embodiments of the present invention, the two nodes that some pairs of SONET/SDH rings have in common are not adjacent to each other.

In accordance with the illustrative embodiment, there is one node that has an address in the address space of three different SONET/SDH rings. From Table 4 it can be seen that node 110-3 has an address in the address space of SONET/SDH rings 101, 102, and 103. In some alternative embodiments of the present invention, there are no nodes that have an address in the address space of three different SONET/SDH rings. In yet some other embodiments of the present invention, there one or more nodes that have an address in the address space of four or more different SONET/SDH rings.

In accordance with the illustrative embodiment, each of SONET/SDH ring 101, SONET/SDH ring 102, and SONET/SDH ring 103 operates as a Bidirectional Line Switched Ring ("BLSR"). In some alternative embodiments of the present invention, however, each rings operates as:
  i. a Unidirectional Line Switched Ring ("ULSR"), or
  ii. a Bidirectional Line Switched Ring ("BLSR").

In accordance with the illustrative embodiment, each ring is a two-fiber ring (i.e., there is one pair of optical fibers between each pair of adjacent nodes in the ring). In some alternative embodiments of the present invention, one or more of the rings are four-fiber rings, which, as is well known to those skilled in the art, enables span switching on the ring.

In accordance with the illustrative embodiment, dual STS-12 connections—one in each direction—exist between:
  node 110-1 and node 110-2,
  node 110-1 and node 110-4,
  node 110-2 and node 110-5,
  node 110-4 and node 110-10,
  node 110-5 and node 110-6,
  node 110-6 and node-110-7.
  node 110-7 and node 110-8,
  node 110-8 and node 110-9, and
  node 110-9 and node 110-10, In accordance with the illustrative embodiment, dual STS-48 connections—one in each direction—exist between:
  node 110-2 and node 110-3,
  node 110-3 and node 110-7, and
  node 110-4 and node 110-3.

The STS 48 connections between these three pairs of nodes carry traffic that is part of more than one ring. For example, the STS-48 connection between node 110-2 and node 110-3 carries up to 12 STS-1's for SONET/SDH ring 101 and up to 12 STS-1's for SONET/SDH ring 102.

Figure 2:
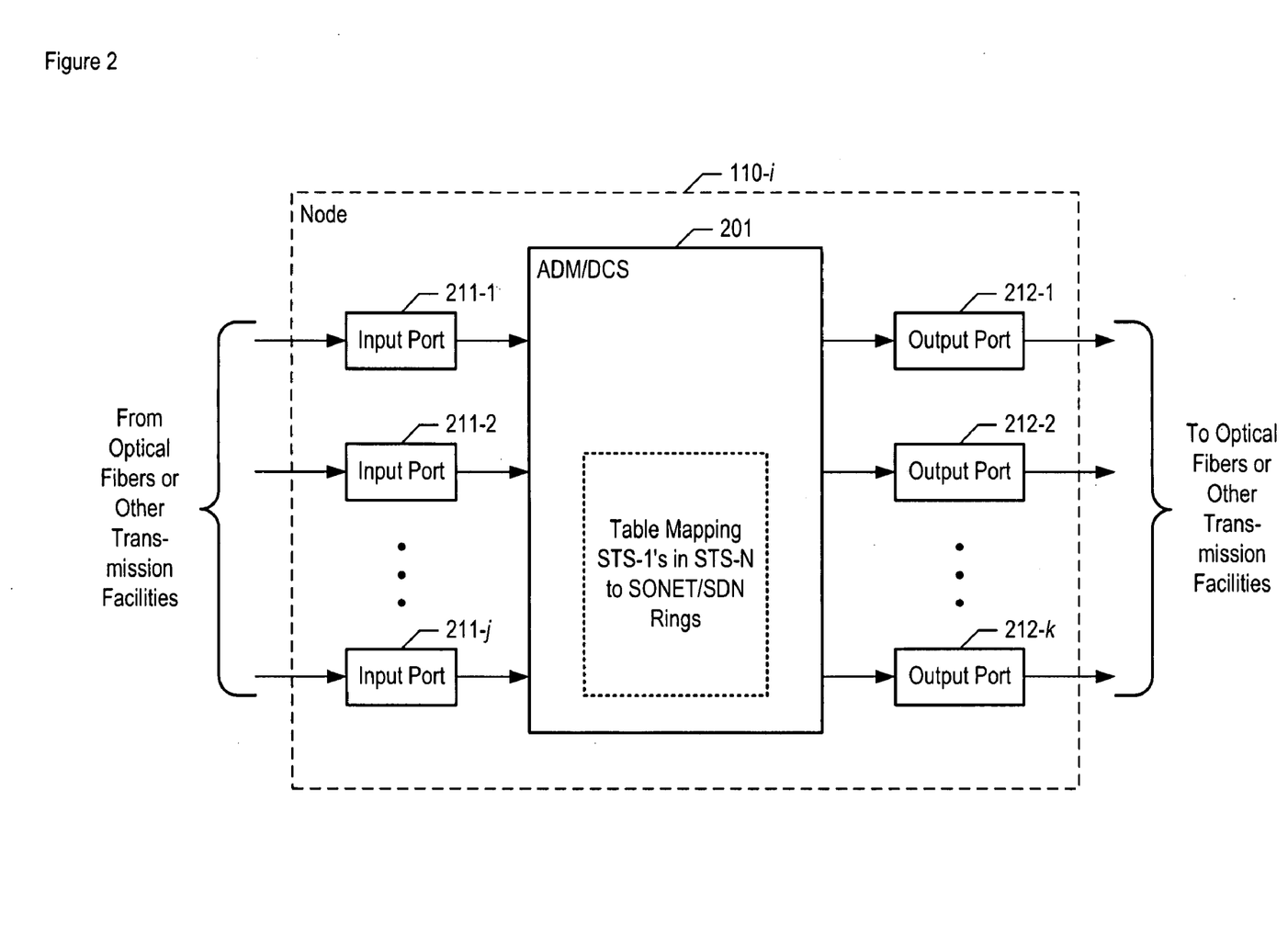
FIG. 2 depicts a block diagram of the salient components of a node in accordance with the illustrative embodiment.

FIG. 2 depicts a block diagram of the salient components of node 110-i, wherein i=1 to 10. Node 110-i comprises add/drop multiplexor-digital cross-connect system ("ADM/DCS") 201, input ports 211-1 through 211-j, wherein j is a positive integer greater than one, and output ports 212-1 through 212-k, wherein k is a positive integer greater than one and wherein j plus k are greater than 2.

Each of input ports 211-1 through 211-j receives a signal (e.g., a low-rate tributary, a STS-N, etc.) from an optical fiber or other transmission facility (e.g., metallic wireline, microwave channel, etc.) and passes the signal to ADM/DCS 201, in well-known fashion.

For the purposes of this specification, a "STS-N" is defined to comprise N STS-1's. For example, an STS-768 comprises 768 STS-1's plus the overhead of the STS-768.

Furthermore, for the purposes of this specification, a "STS-N frame" is defined to comprise N STS-1 frames. For example, an STS-768 frame comprises 768 STS-1 frames.

Each of output ports 212-1 through 212-k receives a signal from ADM/DCS 201 and transmits the signal via an optical fiber or other transmission facility, in well-known fashion.

When node 110-i receives a signal from one or more tributaries, ADM/DCS 201 enables node 110-i to add the tributaries into one or more STS-N's. When node 110-i transmits a signal via one or more tributaries, ADM/DCS 201 enables node 110-i to drop the tributaries from one or more STS-N's. When node 110-i has an address in the address space of two or more SONET/SDH rings, ADM/DCS 201 enables node 110-i to switch all or a portion of an STS-N from one SONET/SDH ring to an STS-N N on another SONET/SDH ring. When node 110-i receives an STS-N that comprises STS-1's associated with different SONET/SDH rings, ADM/DCS 201 enables node 110-i to demultiplex the STS-1's, associate each with its respective SONET/SDH ring, and transmit each STS-1 onto an optical fiber for the SONET/SDH ring associated with the STS-1 . And when node 110-i receives two or more STS-N's that are each associated with different SONET/SDH rings, ADM/DCS 201 enables node 110-i to multiplex the STS-1's and transmit them via a single optical fiber while maintaining their association with their respective SONET/SDH rings. These capabilities are discussed in detail below and with respect to FIGS. 3 and 4.

When node 110-i receives or transmits an STS-N that comprises two or more STS-1's that are associated with different SONET/SDH rings, node 110-i is informed during provisioning which STS-1's are to be associated with which SONET/SDH ring. This information is stored by ADM/DCS 201 in a table that maps each STS-1 in each STS-N to a SONET/SDH ring. Table 5 depicts a portion of such a table.

For example, node 110-3 is capable of receiving an STS-48 from node 110-4 that comprises 6 traffic and 6 protection STS-1's associated with SONET/SDH ring 101 and also 6 traffic and 6 protection STS-1's associated with SONET/SDH ring 103. (The other 24 STS-1's are either empty, or are carrying point-to-point traffic on a path from node 110-3 to 110-4, or are carrying unprotected traffic.) Therefore, during provisioning, a table in node 110-3 is populated to indicate which SONET/SDH ring node 110-3 is to be associated with each STS-1 in the STS-48.

TABLE 5

Mapping of STS-1's To SONET/SDH Rings In Node 110-3 For STS-48 Arriving From Node 110-4.

| STS-1 | Associated SONET/SDH Ring |
|---|---|
| 1 | Ring 101 (traffic) |
| . . . | . . . |
| 6 | Ring 101 (traffic) |
| 7 | Ring 101 (protection) |
| . . . | . . . |
| 12 | Ring 101 (protection) |
| 13 | Ring 103 (traffic) |
| . . . | . . . |
| 18 | Ring 103 (traffic) |
| 19 | Ring 103 (protection) |
| . . . | . . . |
| 24 | Ring 103 (protection) |
| 25 | empty or carrying other traffic |
| . . . | . . . |
| 48 | empty or carrying other traffic |

When node 110-i receives or transmits an STS-N that comprises two or more STS-1's that are associated with different SONET/SDH rings, the STS-N comprises an automatic protection switching channel for each of the different SONET/SDH rings.

In other words, when an STS-48 carries 12 STS-1's from a first SONET/SDH ring and 12 STS-1's from a second SONET/SDH ring, the STS-48 carries:

1. the automatic protection switching channel for the 12 STS-1's from the first SONET/SDH ring (with addresses specified in the address space of the first SONET/SDH ring); and
2. the automatic protection switching channel for the 12 STS-1's from the second SONET/SDH ring (with addresses specified in the address space of the second SONET/SDH ring).

Furthermore, node 110-i:

1. associates and applies the automatic protection switching channel for the 12 STS-1's from the first SONET/SDH ring only to the 12 STS-1's from the first SONET/SDH ring, and
2. associates and applies the automatic protection switching channel for the 12 STS-1's from the second SONET/SDH ring only to the 12 STS-1's from the second SONET/SDH ring.

The current SONET/SDH standard specifies how each STS-N is to carry and use its automatic protection switching channel. First, the current SONET/SDH standard specifies that each STS-N carries only one automatic protection switching channel. Second, the current SONET/SDH standard specifies that the automatic protection switching channel is to be carried in the $K_1$ and $K_2$ line overhead bytes of the overhead of the first STS-1 of the STS-N. Third, the current SONET/SDH standard specifies that the automatic protection switching channel is to be associated with and applied to all of the STS-1's in the STS-N. And fourth, the current SONET/SDH standard specifies that the bytes in row 5, columns 2 and 3 of the second through Nth STS-1's of the STS-N are undefined.

In contrast, and in accordance with the illustrative embodiment of the present invention, each STS-N carries one automatic protection switching channel for each SONET/SDH ring represented in the STS-N. Second, the mth automatic protection switching channel is carried in the bytes in row 5, columns 2 and 3 of the mth STS-1. Third, the mth automatic protection switching channel is to be associated with and applied only to the STS-1's associated with the SONET/SDH ring associated with the mth automatic protection switching channel. Towards this end, node 110-i comprises the data, such as that depicted in Tables 6 and 7, that enables node 110-i to know the location of the automatic protection switching channels in an STS-N and to know which STS-1's in the STS-N are to be associated with which automatic protection switching channels.

Continuing with the example depicted in Table 5, Table 6 indicates how node 110-i knows the witching channels in the STS-N (for N=48). In some alternative embodiments of the present invention, the automatic protection switching channels are placed elsewhere in the STS-N.

TABLE 6

Location of Automatic Protection Switching Channels in STS-48 for $1 \leq m \leq 2$.

| m | Location of mth automatic protection switching channel in STS-48 |
|---|---|
| 1 | the bytes in row 5, columns 2 and 3 of the 1st STS-1 of the STS-48 |
| 2 | the bytes in row 5, columns 2 and 3 of the 2nd STS-1 of the STS-48 |

Furthermore, Table 7 indicates how node 110-i knows which STS-1's in the STS-N are to be associated with which automatic protection switching channels. In some alternative embodiments of the present invention, Tables 5, 6, and 7 are consolidated into a single table.

TABLE 7

Association of STS-1's in STS-48 with Automatic Protection Switching Channels

| STS-1 | Associated APS Channel |
|---|---|
| 1 | m = 1 (traffic) |
| ... | ... |
| 6 | m = 1 (traffic) |
| 7 | m = 1 (protection) |
| ... | ... |
| 12 | m = 1 (protection) |
| 13 | m = 2 (traffic) |
| ... | ... |
| 18 | m = 2 (traffic) |
| 19 | m = 2 (protection) |
| ... | ... |
| 24 | m = 2 (protection) |
| 25 | empty or carrying other traffic |
| ... | ... |
| 48 | empty or carrying other traffic |

In accordance with the illustrative embodiment, node 110-i is populated with the data in Tables 5, 6, and 7 at the time of establishing the ring and at the time of provisioning or reprovisioning each service.

Figure 3:
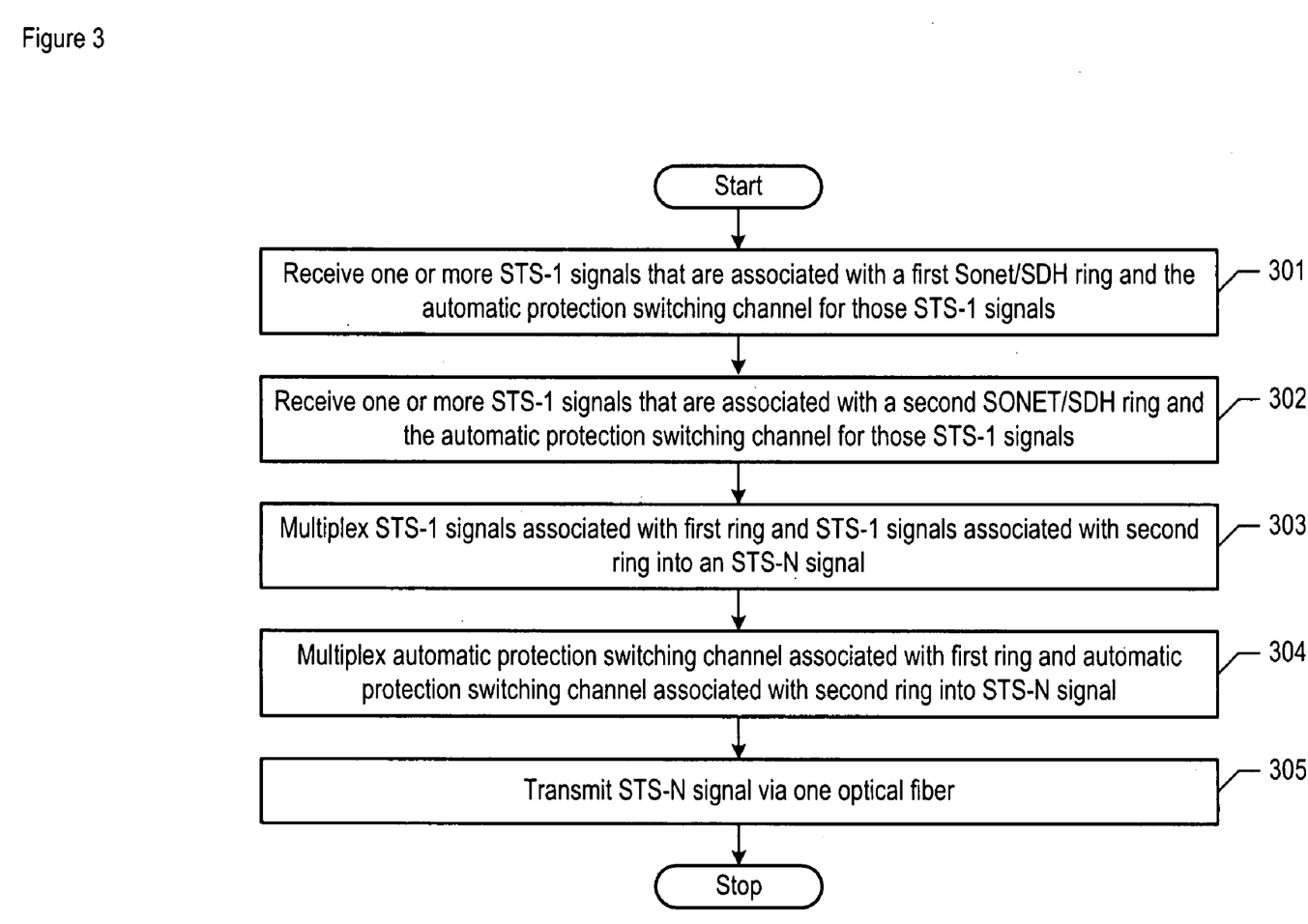
FIG. 3 depicts a flowchart of the operation of a node 110-i in accordance with the illustrative embodiment that multiplexes the traffic of two or more SONET/SDH rings onto a single fiber.

When node 110-i receives two or more STS-N's that are each associated with different SONET/SDH rings, ADM/DCS 201 enables node 110-i to multiplex the STS-1's and transmit them via a single optical fiber while maintaining their association with their respective SONET/SDH rings. FIG. 3 depicts a flowchart of the operation of node 110-i in accomplishing this.

It will be clear to those skilled in the art that some of the tasks depicted in FIG. 3 can be performed simultaneously, concurrently, or at different times. Furthermore, it will be clear to those skilled in the art that some combinations of the tasks depicted in FIG. 3 can be performed in a single step, while other combinations of the tasks require two or more steps.

At task 301, node 110-i receives one or more STS-1's that are associated with a first SONET/SDH ring and a first automatic protection switching channel. These STS-1's and the first automatic protection switching channel can be received from an STS-N frame that is solely associated with the first SONET/SDH ring, or they can be received from an STS-N frame that also carries STS-1's and the automatic protection switching channel associated with a third SONET/SDH ring.

At task 302, node 110-i receives one or more STS-1's that are associated with a second SONET/SDH ring and a second automatic protection switching channel. These STS-1's and the second automatic protection switching channel can be received from an STS-N frame that is solely associated with the second SONET/SDH ring, or they can be received from an STS-N frame that also carries STS-1's and the automatic protection switching channel associated with a third SONET/SDH ring.

At task 303, node 110-i multiplexes the STS-1's associated with the first SONET/SDH ring and the STS-1's associated with the second SONET/SDH ring into an STS-N that has sufficient capacity to carry them. Node 110-i knows which STS-1's to place in which time slots of the STS-N based on data such as that contained in Table 5.

At task 304, node 110-i multiplexes the first automatic protection switching channel and the second automatic protection switching channel into the STS-N. Node 110-i knows where to place the automatic protection switching channels in the STS-N based on data such as that contained in Table 6. In accordance with the illustrative embodiment of the present invention, the first automatic protection switching channel comprises a source address and a destination address in the address space of the first SONET/SDH ring. Furthermore, the second automatic protection switching channel comprises a source address and a destination address in the address space of the second SONET/SDH ring.

At task 305, node 110-i transmits the STS-N onto a single optical fiber, such that the optical fiber carries one STS-N that comprises:
1. a STS-1 that is associated with the first SONET/SDH ring;
2. a STS-1 that is associated with the second SONET/SDH ring;
3. the automatic protection switching channel (e.g., the $K_1$ and $K_2$ line overhead bytes that are associated with the first SONET/SDH ring, etc.) that is associated with the first SONET/SDH ring; and
4. the automatic protection switching channel (e.g., the $K_1$ and $K_2$ line overhead bytes that are associated with the second SONET/SDH ring, etc.) that is associated with the second SONET/SDH ring.

Figure 4:
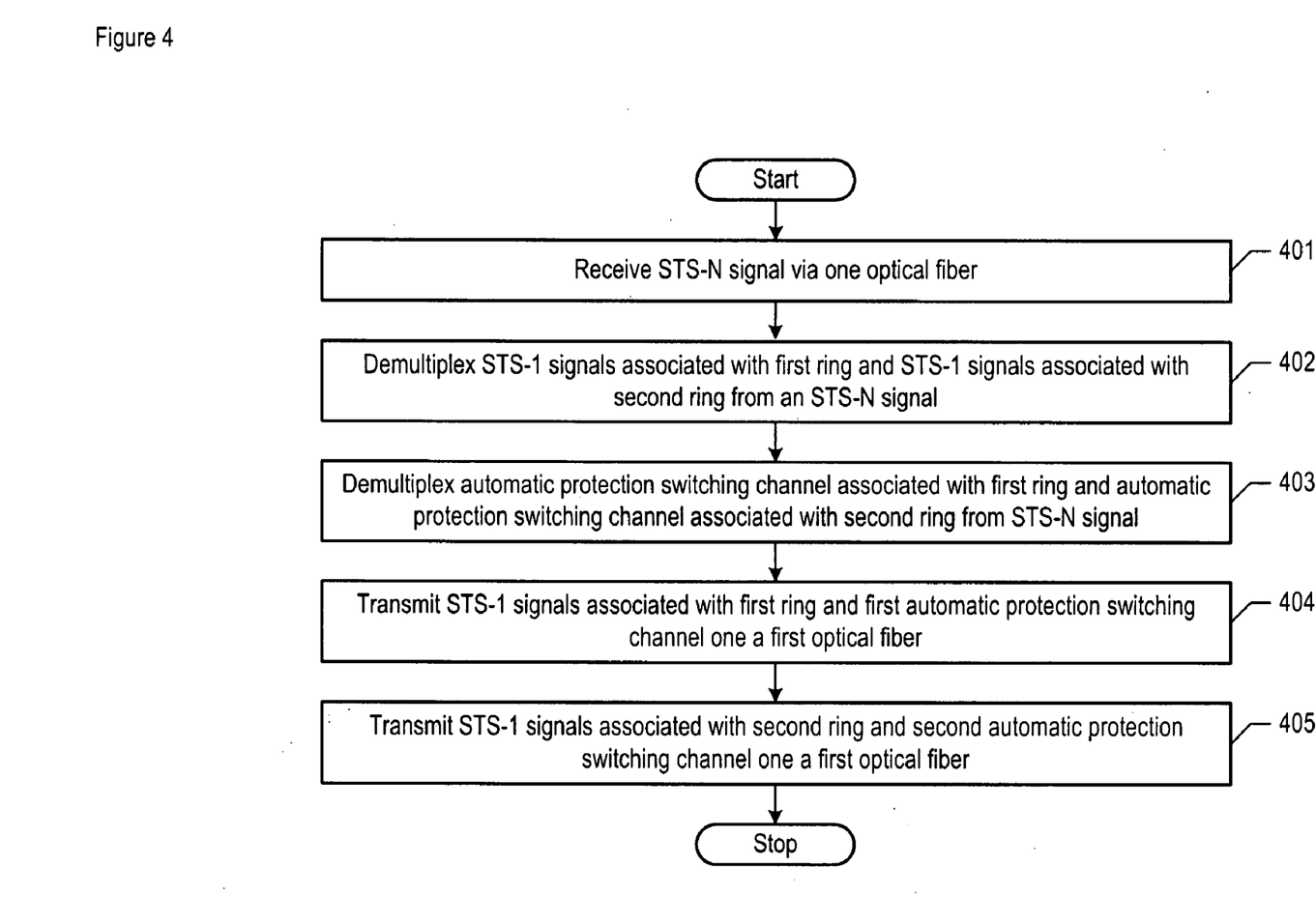
FIG. 4 depicts a flowchart of the operation of a node 110-i in accordance with the illustrative embodiment that demultiplexes the traffic of two or more SONET/SDH rings from a single fiber.

When node 110-i receives an STS-N that comprises STS-1's associated with different SONET/SDH rings, ADM/DCS 201 enables node 110-i to demultiplex the STS-1's, associate each with its respective SONET/SDH ring, and transmit each STS-1 onto an optical fiber for the SONET/SDH ring associated with the STS-1. FIG. 4 depicts a flowchart of the operation of node 110-i in accomplishing this.

It will be clear to those skilled in the art that some of the tasks depicted in FIG. 4 can be performed simultaneously, concurrently, or at different times. Furthermore, it will be clear to those skilled in the art that some combinations of the tasks depicted in FIG. 4 can be performed in a single step, while other combinations of the tasks require two or more steps.

At task 401, node 110-i receives from a single optical fiber one STS-N that comprises:
1. a STS-1 that is associated with the first SONET/SDH ring;
2. a STS-1 that is associated with the second SONET/SDH ring;
3. the automatic protection switching channel (e.g., the $K_1$ and $K_2$ line overhead bytes that are associated with the first SONET/SDH ring, etc.) that is associated with the first SONET/SDH ring; and
4. the automatic protection switching channel (e.g., the $K_1$ and $K_2$ line overhead bytes that are associated with the second SONET/SDH ring, etc.) that is associated with the second SONET/SDH ring.

At task 402, node 110-i demultiplexes the STS-1's associated with the first SONET/SDH ring and the STS-1's associated with the second SONET/SDH ring from the STS-N. Node 110-i knows which STS-1's in the STS-N are associated with each SONET/SDH ring based on data such as that contained in Table 5.

At task 403, node 110-i demultiplexes the first automatic protection switching channel and the second automatic protection switching channel from the STS-N. Node 110-i knows where to find the automatic protection switching channels in the STS-N based on data such as that contained in Table 6.

At task 404, node 110-i transmits the STS-1's associated with the first SONET/SDH ring and the first automatic protection switching channel onto a first optical fiber. These STS-1's and the first automatic protection switching channel can be carried in an STS-N frame that is solely associated with the first SONET/SDH ring, or they can be carried in an STS-N frame that also carries STS-1's and the automatic protection switching channel associated with a third SONET/SDH ring.

At task 405, node 110-i transmits the STS-1's associated with the second SONET/SDH ring and the second automatic protection switching channel onto a second optical fiber that is distinct from the first optical fiber. These STS-1's and the second automatic protection switching channel can be carried in an STS-N frame that is solely associated with the second SONET/SDH ring, or they can be carried in an STS-N frame that also carries STS-1's and the automatic protection switching channel associated with a third SONET/SDH ring.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method of operating a time-division multiplexed telecommunications system, said method comprising:
   receiving a first optical carrier signal that comprises a first source address and a first destination address in a first address space;
   receiving a second optical carrier signal that comprises a first source address and a first destination address in a second address space;
   multiplexing said first optical carrier signal and said second optical carrier signal into a SONET/SDH traffic frame; and
   transmitting said SONET/SDH traffic frame;
   wherein said first optical carrier signal in said frame comprises a second source address and a second destination address in said first address space;
   wherein said second optical carrier signal in said frame comprises a second source address and a second destination address in said second address space; and
   wherein traffic frames are distinguished from protection frames.

2. The method of claim 1 further comprising:
   receiving said SONET/SDH traffic frame;
   demultiplexing said first optical carrier signal and said second optical carrier signal from said SONET/SDH traffic frame;

transmitting said first optical carrier signal, wherein said first optical carrier signal as transmitted comprises a third source address and a third destination address in said first address space; and transmitting said second optical carrier signal, wherein said second optical carrier signal as transmitted comprises a fourth source address and a fourth destination address in said second address space.

3. A method of operating a time-division multiplexed telecommunications system, said method comprising:

receiving a SONET/SDH traffic frame that comprises (1) a first optical carrier signal that comprises a first source address and a first destination address in a first address space, and (2) a second optical carrier signal that comprises a first source address and a first destination address in a second address space, wherein traffic frames are distinguished from protection frames;

demultiplexing said first optical carrier signal and said second optical carrier signal from said SONET/SDH traffic frame;

transmitting said first optical carder signal, wherein said first optical carrier signal as transmitted comprises a second source address and a second destination address in said first address space; and transmitting said second optical carrier signal, wherein said second optical carrier signal as transmitted comprises a second source address and a second destination address in said second address space.

4. The method of claim 3 further comprising:

receiving a first optical carrier signal that comprises a third source address and a third destination address in a first address space;

receiving a second optical carrier signal that comprises a fourth source address and a fourth destination address in a second address space;

multiplexing said first optical carrier signal and said second optical carrier signal into said frame; and transmitting said SONET/SDH traffic frame;

wherein said first optical carrier signal in said SONET/SDH traffic frame comprises said first source address and said first destination address in said first address space; and wherein said second optical carrier signal in said SONET/SDH traffic frame comprises said first source address and said first destination address in said second address space.

* * * * *